(12) United States Patent
Boulanger

(10) Patent No.: US 11,948,355 B2
(45) Date of Patent: Apr. 2, 2024

(54) SYNTHETIC INFRARED DATA FOR IMAGE CLASSIFICATION SYSTEMS AND METHODS

(71) Applicant: Teledyne FLIR Commercial Systems, Inc., Goleta, CA (US)

(72) Inventor: Pierre M. Boulanger, Goleta, CA (US)

(73) Assignee: Teledyne FLIR Commercial Systems, Inc., Goleta, CA (US)

(*) Notice: Subject to any disclaimer, the term of this patent is extended or adjusted under 35 U.S.C. 154(b) by 523 days.

(21) Appl. No.: 17/127,684

(22) Filed: Dec. 18, 2020

(65) Prior Publication Data

US 2021/0150267 A1 May 20, 2021

Related U.S. Application Data

(63) Continuation of application No. PCT/US2019/037555, filed on Jun. 17, 2019.
(Continued)

(51) Int. Cl.
*G06V 20/20* (2022.01)
*G06F 16/51* (2019.01)
(Continued)

(52) U.S. Cl.
CPC .......... *G06V 20/20* (2022.01); *G06F 16/51* (2019.01); *G06F 18/214* (2023.01); *G06F 18/217* (2023.01); *G06F 18/2413* (2023.01); *G06F 18/28* (2023.01); *G06N 3/04* (2013.01); *G06N 3/08* (2013.01); *G06T 17/00* (2013.01); *G06V 10/764* (2022.01); *G06V 10/774* (2022.01); *G06V 10/82* (2022.01); *G06V 20/64* (2022.01); *H04N 23/11* (2023.01)

(58) Field of Classification Search
CPC ................................ G06V 20/20; G06F 16/51
See application file for complete search history.

(56) References Cited

U.S. PATENT DOCUMENTS

2018/0330205 A1* 11/2018 Wu .......................... G06N 3/02

OTHER PUBLICATIONS

S. Kim, W.-J. Song and S.-H. Kim, "Infrared Variation Optimized Deep Convolutional Neural Network for Robust Automatic Ground Target Recognition," 2017 IEEE Conference on Computer Vision and Pattern Recognition Workshops (CVPRW), Honolulu, HI, USA, 2017, pp. 195-202, doi: 10.1109/CVPRW.2017.30 (Year: 2017).*

(Continued)

*Primary Examiner* — Shivang I Patel
(74) *Attorney, Agent, or Firm* — Haynes and Boone, LLP

(57) ABSTRACT

An image classification system comprises a neural network trained on a synthetic infrared training dataset, including synthetic infrared images of objects rendered from a virtually represented infrared sensor in a virtual three-dimensional scene, the synthetic infrared images being generated using infrared radiation signatures of virtual objects in the virtual three-dimensional scene and an infrared response model of the virtually represented infrared sensor. A system for generating synthetic infrared training data comprises a three-dimensional scene modeling system operable to generate three-dimensional scenes comprising a plurality of objects, each object having an infrared radiation model, and an infrared sensor modeling system operable to model an imaging response for an infrared sensor virtually represented in the three-dimensional scene.

20 Claims, 9 Drawing Sheets

Related U.S. Application Data

(60) Provisional application No. 62/686,627, filed on Jun. 18, 2018.

(51) Int. Cl.
| | |
|---|---|
| *G06F 18/21* | (2023.01) |
| *G06F 18/214* | (2023.01) |
| *G06F 18/2413* | (2023.01) |
| *G06F 18/28* | (2023.01) |
| *G06N 3/04* | (2023.01) |
| *G06N 3/08* | (2023.01) |
| *G06T 17/00* | (2006.01) |
| *G06V 10/764* | (2022.01) |
| *G06V 10/774* | (2022.01) |
| *G06V 10/82* | (2022.01) |
| *G06V 20/64* | (2022.01) |
| *H04N 23/11* | (2023.01) |

(56) References Cited

OTHER PUBLICATIONS

Kim Sungho et al.: "Optimized Deep Convolutional Neural Network for Robust Automatic Ground Target Recognition", 2017 IEEE Conference on Computer Vision and Pattern Recognition Workshops, IEEE, Jul. 21, 2017 (Jul. 21, 2017), pp. 195-202, XP033145773.

Jean Latger et al.: "Simulation of active and passive infrared images using the Se-Workbench", Proceedings SPIE 7513, 2009 International Conference on Optical Instruments And Technology, vol. 6543, Apr. 27, 2007 (Apr. 27, 2007), p. 654302, XP055607381, 1000 20th St. Bellingham, WA 98225-6705 USA.

Omnivision Technologies et al.: "Dual-Purpose RGB IR CameraChip (TM) Sensor Brings High Sensitivity and High Frame Rates to Mobile and Machine Vision Applications", Oct. 1, 2014 (Oct. 1, 2014), XP055607383, Retrieved from the Internet: URL: https://www.ovt.com/download/sensorpdf/145/0mni Vision_ZZZ-E0L-0V4682.pdf [retrieved on Jul. 19, 2019].

* cited by examiner

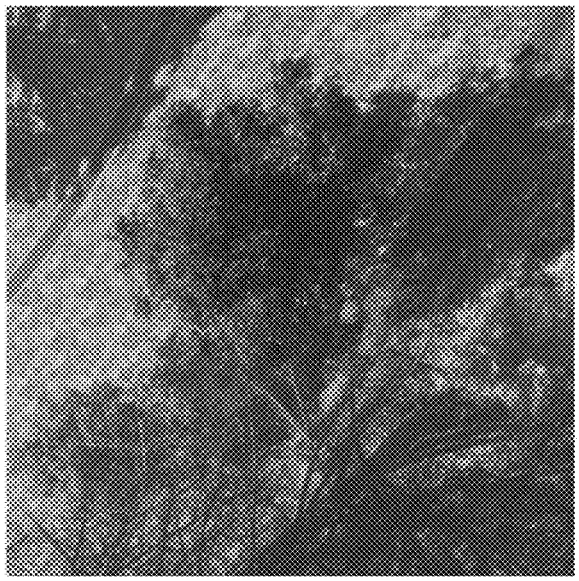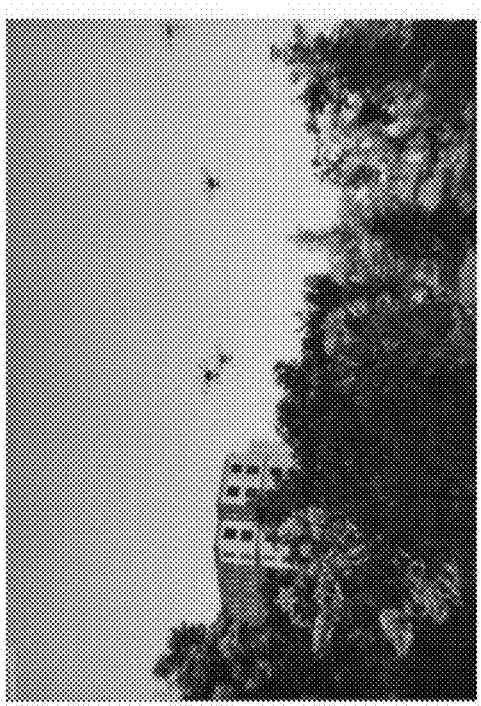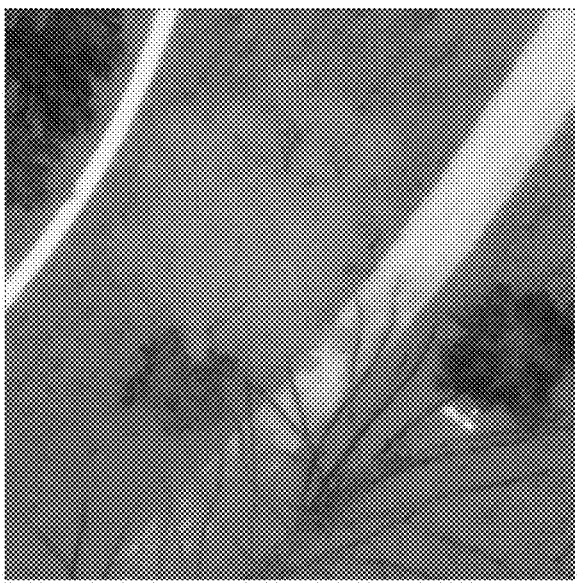
FIG. 7A
FIG. 7B
FIG. 8A
FIG. 8B

SYNTHETIC INFRARED DATA FOR IMAGE CLASSIFICATION SYSTEMS AND METHODS

CROSS-REFERENCE TO RELATED APPLICATIONS

This application is a continuation of International Patent Application No. PCT/US2019/037555 filed Jun. 17, 2019 entitled "SYNTHETIC INFRARED DATA FOR IMAGE CLASSIFICATION SYSTEMS AND METHODS," which is incorporated herein by reference in its entirety.

International Patent Application No. PCT/US2019/037555 filed Jun. 17, 2019 claims the benefit of U.S. Provisional Patent Application No. 62/686,627 filed Jun. 18, 2018 and entitled "SYNTHETIC INFRARED DATA FOR IMAGE CLASSIFICATION SYSTEMS AND METHODS" which is hereby incorporated by reference in its entirety.

TECHNICAL FIELD

One or more embodiments of the present disclosure relate generally to image classification, and more particularly, for example, to systems and methods for training a neural network for infrared image classification.

BACKGROUND

In the field of image processing, there is an ongoing need for efficient and reliable ways to detect and classify objects of interest within a field of view (e.g., a scene) of an imaging device. In one approach, various images of an object of interest are collected into a training dataset for training a neural network to classify the object. The training images may be generated with a camera capturing images of the object at various angles and in various setting. A training dataset can include thousands of images for each object classification, and can be time consuming, expensive and burdensome to produce. Some training images may be impractical to capture using a camera due to a risky location or an attempt to capture an image of a rare and unpredictable occurrence. As a result, such image processing systems may be difficult to adapt to new objects and environments. In view of the foregoing, there is a continued need for improved object detection and classification solutions that are easily adaptable to new use cases, including infrared imaging systems, and that provide performance or other advantages over conventional systems.

SUMMARY

Various techniques are provided for training a neural network to classify infrared images. In one or more embodiments, synthetic infrared imagery is generated to train a neural network (such as a convolutional neural network (CNN)) for image classification. In one or more embodiments, an image classification system comprises a neural network trained on a synthetic infrared training dataset, including synthetic infrared images of objects rendered from a virtually represented infrared sensor in a virtual three-dimensional scene, the synthetic infrared images being generated using infrared radiation signatures of virtual objects in the virtual three-dimensional scene and an infrared response model of the virtually represented infrared sensor. In one or more embodiments, a system for generating synthetic infrared training data comprises a three-dimensional scene modeling system operable to generate three-dimensional scenes comprising a plurality of objects, each object having an infrared radiation model, and an infrared sensor modeling system operable to model an imaging response for an infrared sensor virtually represented in the three-dimensional scene.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 7A-B illustrate sample images for use in an object classification system trained to classify a drone, in accordance with various embodiments of the present disclosure.

FIGS. 8A-B illustrate sample images for use in an object classification system trained to classify a person in a search and rescue operation, in accordance with various embodiments of the present disclosure.

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to image classification, and more particularly, for example, to systems and methods for training a neural network for infrared image classification. In one or more embodiments, synthetic infrared images of a virtual three-dimensional environment are generated and used to train a neural network (such as a convolutional neural network (CNN)) for infrared image classification. Performing video and/or image analytics using a CNN generally includes thousands of diverse images to achieve an acceptable level of accuracy for many use environments, but capturing such imagery using a physical infrared imaging device to image a real world scene can be very expensive. In accordance with various embodiments disclosed herein, synthetic infrared imagery is generated and then used in a dataset to train a CNN in systems and methods that reduce costs and effort, and improve infrared image classification accuracy over conventional systems.

Figure 1:
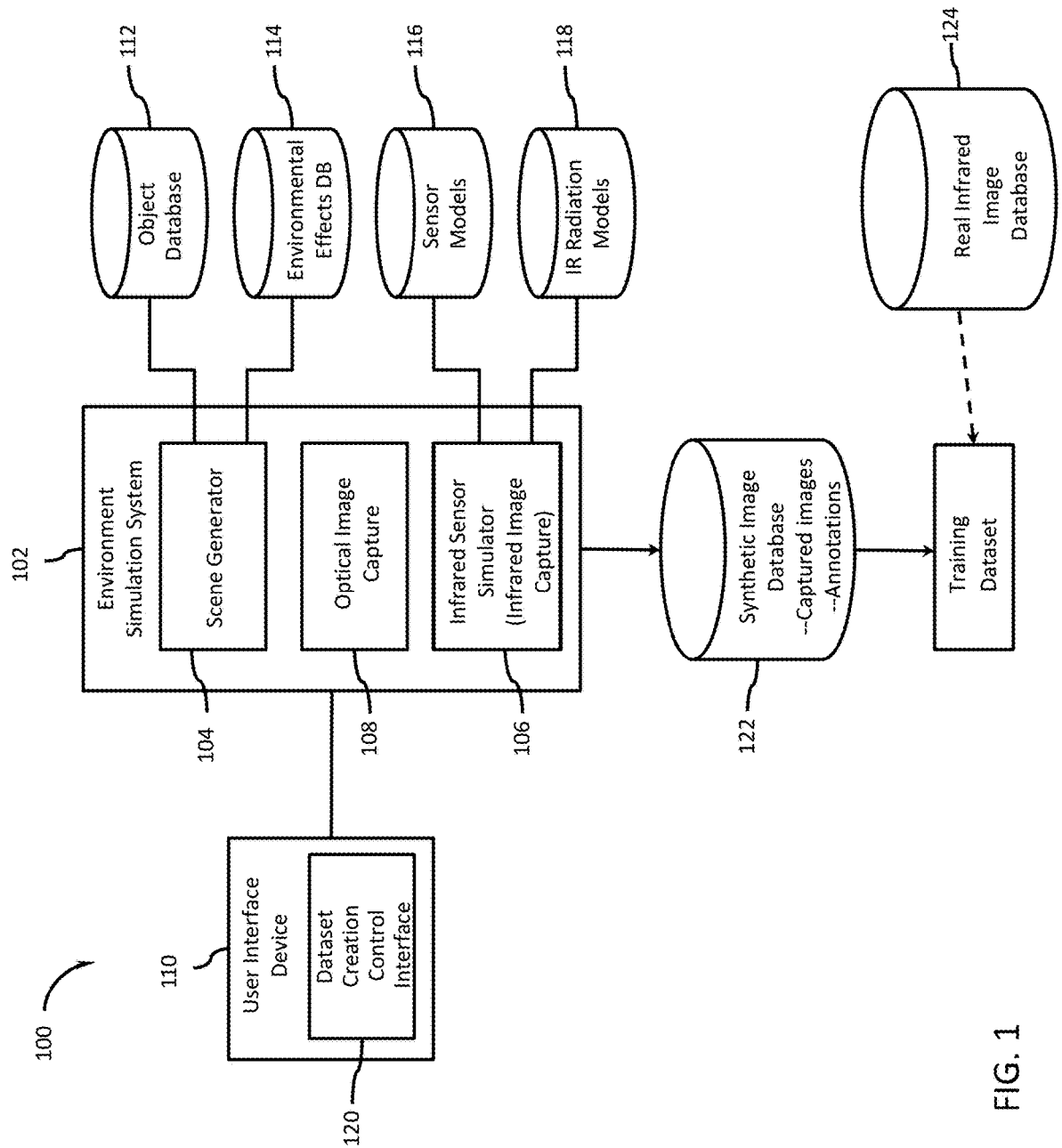
FIG. 1 illustrates an exemplary system for generating a set of synthetic infrared image data for training an image classification system, in accordance with various embodiments of the present disclosure.

Referring to FIG. 1, embodiments of a synthetic infrared imaging system 100 for generating a synthetic infrared training dataset will be described. As illustrated, the synthetic infrared imaging system 100 includes an environment simulation system 102 operable through a user interface device 110. In various embodiments, the environment simulation system 102 may include one or more computing devices operable to generate a three-dimensional (3D) environment simulating real world settings. The 3D environment may be constructed from a plurality of objects, including terrain, buildings, vehicles, people, animals and other objects that may appear in a captured image of a real world scene. In various embodiments, the synthetic infrared imaging system 100 is configured to generate synthetic infrared images that simulate infrared images captured from a real infrared camera.

In various embodiments, the environment simulation system 102 includes a scene generator 104 and an infrared sensor simulator 106. The scene generator 104 is operable to build a virtual 3D environment utilizing data from an object database 112, which stores 3D models and other object data allowing a modeled 3D object to be placed in the scene. The scene generator 104 may also apply environmental effects 114 (such as weather conditions, temperature, time of day, etc.). The environment simulation system 102 may optionally include an optical image capture component 108 for capturing optical images of a generated scene.

The infrared sensor simulator 106 is used to render a synthetic infrared image of the generated scene from the point of view of an infrared sensor. An infrared sensor model for each real world camera or imaging device is created and stored in the sensor models database 116 and may include sensor properties such as the wavelengths detected and pixel resolution of the physical device. In operation, a scene is created, environmental conditions are applied and a virtual infrared camera is positioned within the scene. The infrared radiation (e.g., heat) generated from the surface of each object in the scene is propagated to simulate real life heat transfer (e.g., by applying heat ray tracing from each surface), thermal signatures and other infrared radiation. In some embodiments, a motion factor may be applied to model infrared radiation as one or more objects move through the scene. A synthetic infrared image captures the infrared radiation in the scene from the position of the virtual infrared camera as modeled by an appropriate sensor model.

In various embodiments, infrared sensor models are created to approximate real world sensor response for a variety of infrared sensors, such as long wave, medium wave and short wave infrared sensors. The sensor models may also model active and passive infrared sensor systems, different wavelengths, such as near-infrared (e.g. night vision), and different physical detectors (e.g., microbolometers, quantum well, diode detectors). The infrared sensor simulator 106 can also combine infrared with any other modality (to cover both infrared and visible, for example). In some embodiments, noise is added to a subset of the synthetic infrared images to account for manufacturing tolerances and other variations affecting the operation of real world infrared sensors. For example, an embodiment may randomly apply one of ten types of noise to a subset of images to simulate a range of images captured from real world infrared cameras. Noise may also be added to account for other system and imaging variations, including non-realistic effects, to cause the system to learn to recognize objects regardless of its surroundings and obscurants.

In some embodiments, the optical image capture component 108 may be used to generate a synthetic visible light image of the scene. The synthetic visible light image may be stored with the synthetic infrared image for use in object classification. In other embodiments, the infrared sensor simulator 106 and optical image capture component 108 may operate to model a multi spectral dynamic imaging system (MSX) which generates a single combined image including a radiometric component of the captured synthetic infrared image and a blended component including infrared (e.g., thermal) characteristics of the scene blended with the visible light image.

In various embodiments, an object stored in the object database 112 includes a wire mesh model comprising a plurality of polygons, such as triangles. The wire mesh model includes a skin that reflects visible light, allowing the object to be visually represented in a three-dimensional scene. For infrared imaging, the infrared radiation models are applied to the three-dimensional objects in the scene. The infrared radiation models database 118 stores models for simulating the radiation transmitted from the three-dimensional objects, including fields associating objects with the infrared radiation models. In one or more embodiments, each triangular surface of an object is modeled using properties of the object's surface emissivity and/or expected temperature. For example, for each triangle, a model is created based on the emissivity of the particular skin, and the infrared radiation may be propagated in the scene through a ray tracing process from each triangular surface.

The properties of the object's skin on the three-dimensional wire mesh structure may be associated with real world infrared radiation models. A challenge is to create models for every object that may appear in a scene. One approach is to capture real world infrared images of each object to be modeled, however, this may be time consuming and expensive. In one embodiment, a three-dimensional object includes a surface skin having known texture and other properties, and the system applies an infrared radiation model generally associated with the surface skin and/or a general object classification. For example, an infrared radiation model for a mammal with fur may be applied to other mammals with similar fur characteristics. In one embodiment, a generalized model may be used for new objects. If feedback from a validation process indicates that the generalized model is not producing accurate image classification results, then a new model may be created or applied for the object to reduce the system error. The models may be updated as necessary to train a system for accurate image classification.

As described further herein, the embodiments of the present disclosure are scalable, allowing for creation of synthetic infrared images that are accurate enough for image classification while optimizing performance within the constraints of a practical system. In one embodiment, object resolution (e.g., the size of the triangles) is scalable to optimize the operation of the environment simulation system 102 in view of time, processing, bandwidth and storage constraints. Many objects may be accurately modeled with a lower resolution (e.g., larger triangles and/or applying fewer rays traced per triangle), and complexity may be added as desired for accurate image classification. A building object, for example, may not require a model of the emissivity of every brick, provided enough features are modeled to allow the image classification system to properly detect or ignore the object. As another example, in many applications such as a system for identifying people, objects such as trees don't require a high degree of accuracy in modeling (e.g., don't need to model every leaf) and may be modeled at a lower complexity than other objects. By applying a range of complexity to the thermal modeling, an accurate and practical system may be created.

In operation, an operator accesses a user interface device 110, and establishes training parameters through a dataset creation control interface 120. Training parameters may include a location, environment, objects to be detected and other factors likely to appear in an infrared image captured by an image capture device, such as a surveillance system. The dataset creation control interface 120 generates a series of infrared images with a variety of locations, objects, angles, distances, and the images are stored in a synthetic image database 122 along with annotations for each image, including the object to be detected from the image and various scene, environmental data and dataset identifiers. The captured synthetic images may be compiled to produce a training dataset for use in training a neural network or other image classification system. In some embodiments, the training dataset may also include real infrared images 124 captured with an infrared camera, optical images captured by the optical image capture component 108, and other data as appropriate.

In various embodiments, it is desirable to have a training set comprising synthetic infrared images of many different scenes. The environment simulation system 102 may be configured to create scenes using randomly created environments including randomness in the number and types of objects in the scene, location of objects, position of camera, and other factors affecting the scene to create a unique image. In some embodiments, non-realistic scenes, backgrounds and effects are imaged to expand the training dataset and create entropy.

The synthetic infrared imaging system 100 may be embodied on one or more computing devices, servers and/or one or more databases, and may be combined with other components in an image classification system. Referring to FIG. 2A, various embodiments of an infrared image classification system 200 will be described. The infrared image classification system 200 may be implemented on one or more servers such as an application server that performs data processing and/or other software execution operations for generating, storing, classifying and retrieving images. In some embodiments, the components of the infrared image classification system 200 may be distributed across a communications network, such as network 222. The communications network 222 may include one or more local networks such as a wireless local area network (WLAN), wide area networks such as the Internet, and other wired or wireless communications paths suitable for facilitating communications between components as described herein. The infrared image classification system 200 includes communications components 214 operable to facilitate communications with one or more network devices 220 over the communications network 222.

In various embodiments, the infrared image classification system 200 may operate as a general purpose image classification system, such as a cloud-based image classification system, or may be configured to operate in a dedicated system, such as a video surveillance system that stores video and images captured in real time from a plurality of image capture devices and identifies and classifies objects using a database 202. The infrared image classification system 200 may be configured to receive one or more infrared images (e.g., an image captured from infrared camera of a video surveillance system) from one or more network devices 220 and process associated object identification/classification requests.

As illustrated, the infrared image classification system 200 includes one or more processors 204 that perform data processing and/or other software execution operations for the infrared image classification system 200. The processor 204 may include logic devices, microcontrollers, processors, application specific integrated circuits (ASICs), field programmable gate arrays (FPGAs) or other devices that may be used by the infrared image classification system 200 to execute appropriate instructions, such as software instructions stored in memory 206 including 3D simulation and image capture component 208, training dataset generation component 210, and image classification component 212 (e.g., a neural network trained by the training dataset), and/or other applications. The memory 206 may be implemented in one or more memory devices (e.g., memory components) that store executable instructions, data and information, including image data, video data, audio data, network information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein.

Each network device 220 may be implemented as a computing device such as a desktop computer or network server, a mobile computing device such as a mobile phone, tablet, laptop computer or other computing device having communications circuitry (e.g., wireless communications circuitry or wired communications circuitry) for connecting with other devices in infrared image classification system 200. In various embodiments, the network device 220 may include an infrared imaging device or a component of a video surveillance system.

The communications components 214 may include circuitry for communicating with other devices using various communications protocols. In various embodiments, communications components 214 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 214 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 214.

Figure 2B:
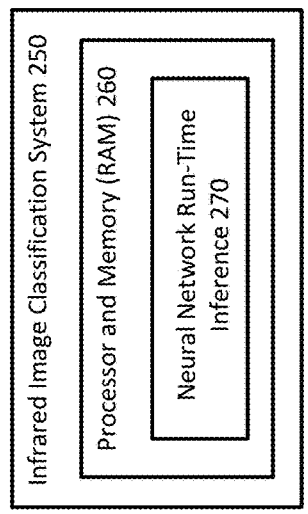
FIGS. 2A-B illustrate exemplary infrared image classification systems using synthetic infrared image data, in accordance with various embodiments of the present disclosure.
Figure 2A:
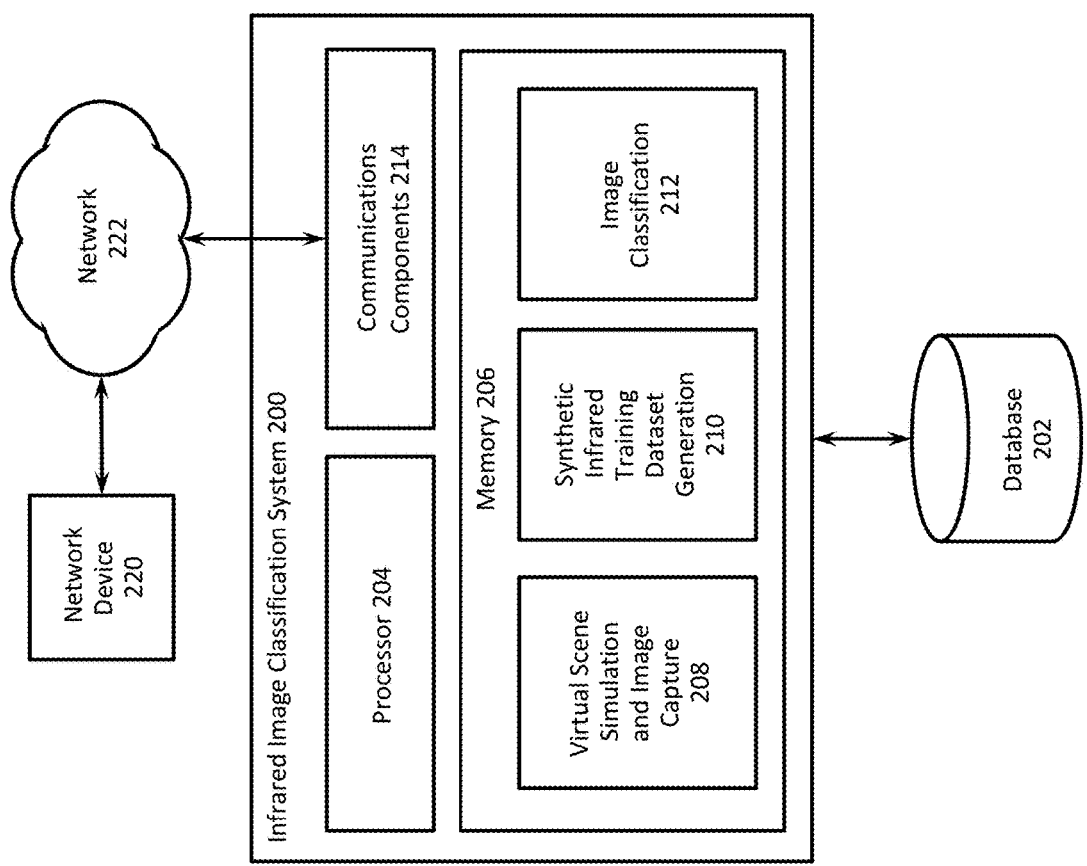

In various embodiments, a trained infrared image classification system may be implemented in a real-time environment, as illustrated in FIG. 2B. The infrared image classification system 250 may include a thermal imaging camera or other device or system operable to receive and/or generate thermal images. In the illustrated embodiment, the infrared image classification system 250 includes a processor and memory 260, operable to store a trained neural network and implement a neural network run-time interface 270 thereon.

Figure 3A:
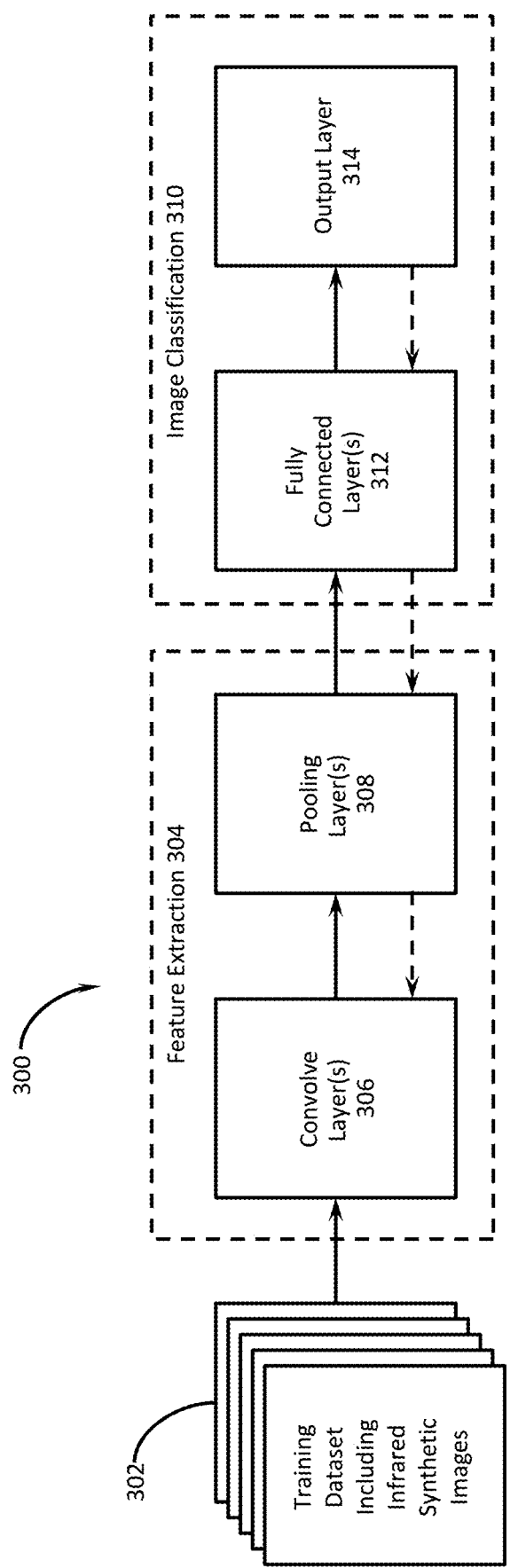
FIG. 3A illustrates a neural network training process using synthetic infrared images, in accordance with various embodiments of the present disclosure.

In various embodiments, the synthetic infrared training dataset disclosed herein may be used to train a neural network or other classification system for object classification. Referring to FIG. 3A, an embodiment of a neural network utilizing synthetic infrared training data will now be described. In one embodiment, the neural network 300 is a convolutional neural network (CNN) that receives the training dataset 302 and outputs a classification for each image. The training dataset includes synthetic infrared images as described herein, and may also include real images captured from an infrared camera. For object classification, the images may comprise a region of interest from a captured image that includes an object to be identified. In one embodiment, the training starts with a forward pass through the neural network 300 including feature extraction 304 in a plurality of convolution layers 306 and pooling layers 308, followed by image classification 310 in a plurality of fully connected layers 312 and an output layer 314. Next, a backward pass through the neural network 300 may be used to update the CNN parameters in view of errors produced in the forward pass (e.g., misclassified objects). In various embodiments, other neural network processes may be used in accordance with the present disclosure.

Figure 3B:
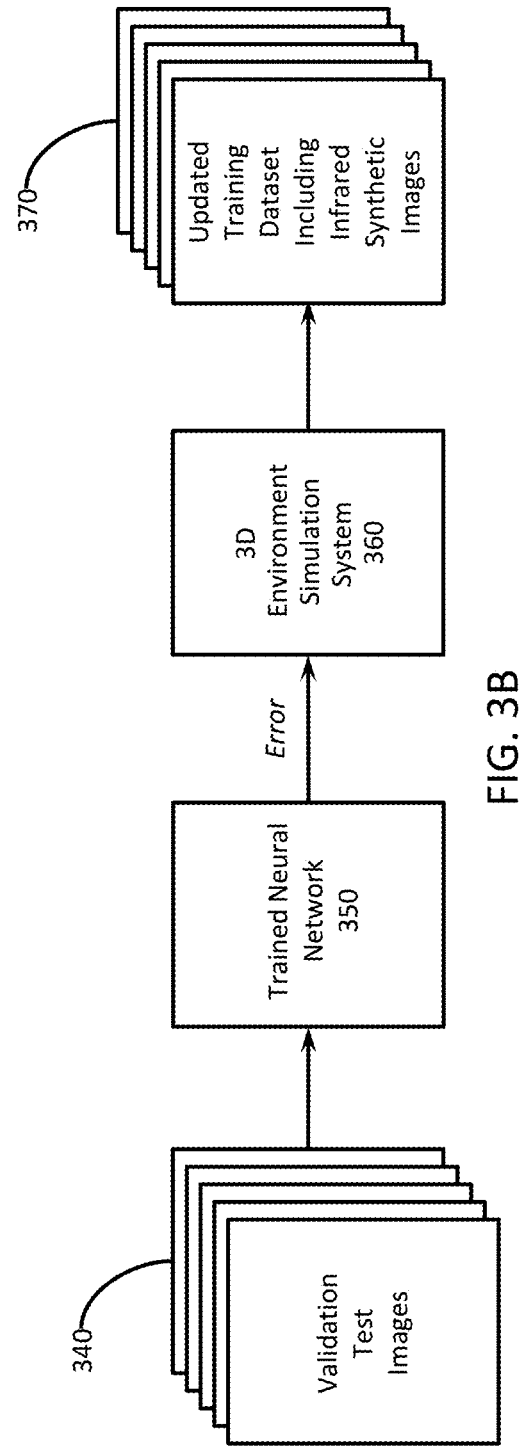
FIG. 3B illustrates a validation process for the neural network of FIG. 3A, in accordance with various embodiments of the present disclosure.

An embodiment for validating the trained neural network is illustrated in FIG. 3B. A set of fully annotated validation test images 340 representing real world images is fed into the trained neural network 350. The validation test images 340 include a variety of objects, object sizes and backgrounds to classify. Detected errors (e.g., image misclassification) may be analyzed and fed back to the 3D environment simulation system 360 to update the synthetic model, which in turn updates the training dataset 370. In various embodiments, detected errors may be corrected by adding more examples an object (e.g., more types of clouds), increasing the resolution of the 3D model and/or increasing the accuracy of the thermal modeling, to help distinguish between objects in an image. By adjusting the synthetic infrared training dataset to improve accuracy, the operator can avoid costly and time consuming efforts to collect needed real world images to update the training dataset.

Figure 3C:
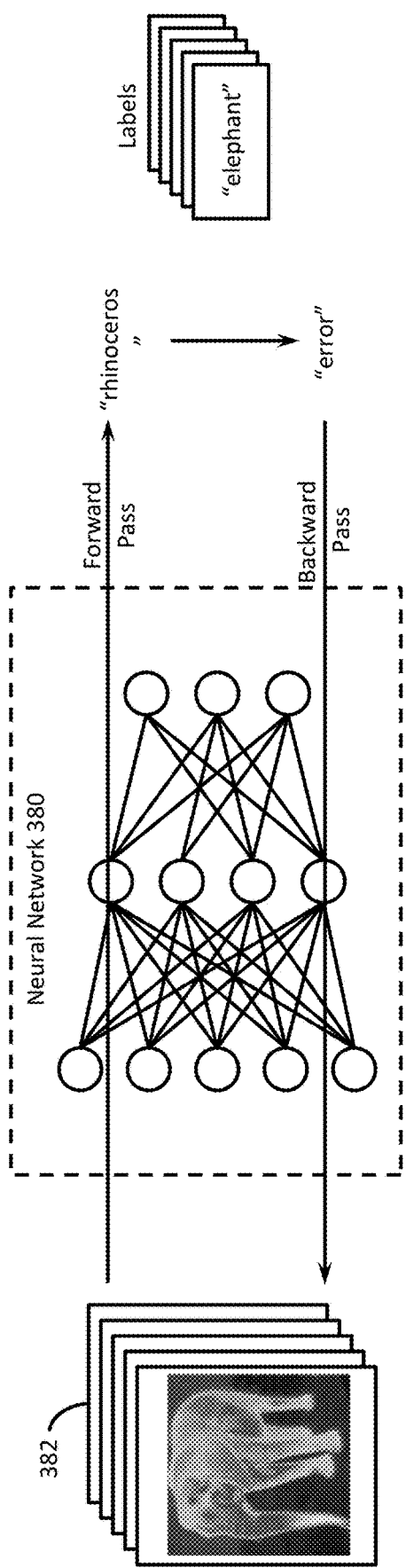
FIG. 3C illustrates a neural network training process using synthetic infrared images, in accordance with various embodiments of the present disclosure.
Figure 3D:
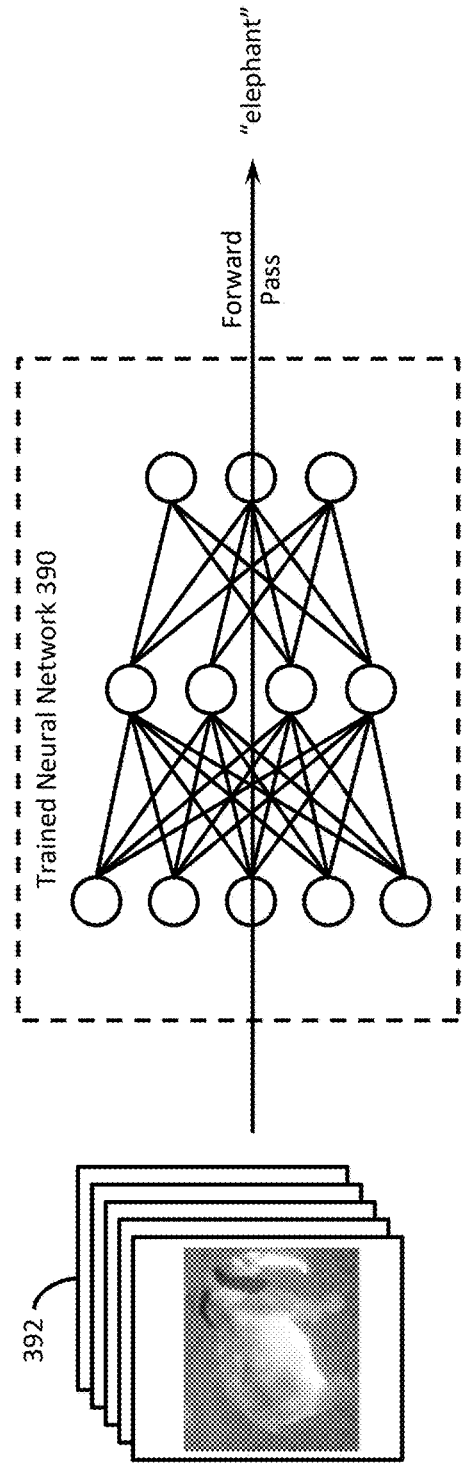
FIG. 3D illustrates an operation of the trained neural network of FIG. 3C, in accordance with various embodiments of the present disclosure.

Referring to FIG. 3C, further details of an embodiment for training a neural network utilizing synthetic infrared training data will now be described. A neural network 380, such as a convolutional neural network, is trained using a training dataset 382 that includes synthetic infrared images as described herein. The training includes with a forward pass through the neural network 380 to produce an image classification. In the illustrated embodiment, a thermal image such as a synthetic thermal image of an elephant is fed to the neural network 380 to produce a classification at the output layer. Each synthetic image is labeled with the correct classification and the output of the neural network 380 is compared to the correct label. If the neural network 380 mislabels the input image (e.g., determines that the image is a "rhinoceros" instead of an "elephant"), then a backward pass through the neural network 380 may be used to adjust the neural network to correct for the misclassification. Referring to FIG. 3D, a trained neural network 390, may then be implemented in an application (i.e., a neural network inference application) on a run time environment to classify thermal images 392.

Figure 4:
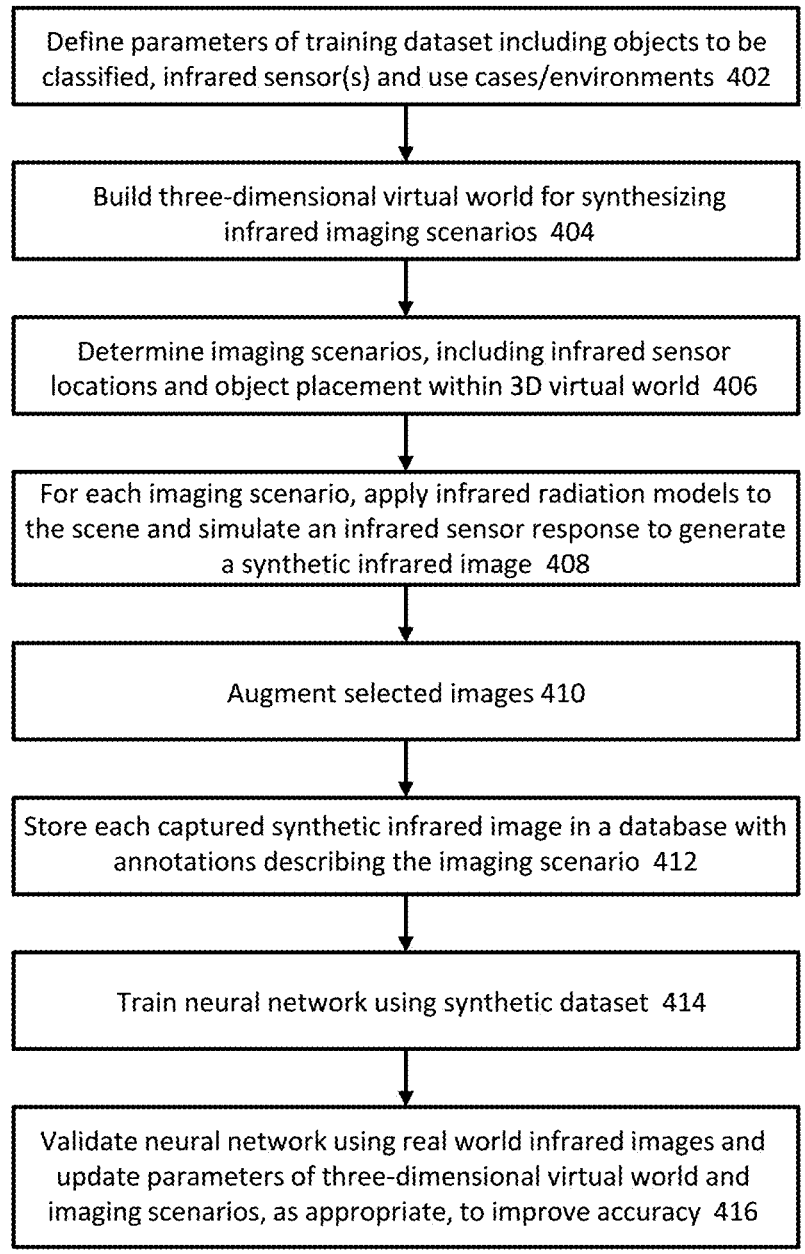
FIG. 4 illustrates an exemplary process for generating synthetic infrared training data for object classification, in accordance with various embodiments of the present disclosure.

Referring to FIG. 4, embodiments of a process for generating training data for object detection in an infrared image in will now be described. In step 402, an operator defines the parameters for the training dataset including an identification of the objects to be detected and classified, the infrared sensors to be modeled and use cases/environments in which images will be captured. In step 404, a three-dimensional virtual world is constructed to model the use case/environments. Next, imaging scenarios are constructed to fill out the training dataset, including infrared sensor locations and object orientation/location within the 3D virtual world, in step 406. For each imaging scenario, infrared radiation models are applied to propagate infrared radiation from the surfaces of the objects, and a simulated infrared sensor response is generated in the form of a synthetic infrared image, in step 408. In step 410, selected images are augmented to model various real world and/or non-realistic scenarios to train the neural network to classify objects in a variety of surroundings and obscurant conditions. For example, selected images may be augmented to add various types of noise, scale the images, flip the images, morph the images via style transfer techniques and other image augmentations.

In step 412, each captured synthetic infrared image is stored in a training set database along with annotations describing the imaging scenario. In various embodiments, the annotations may identify objects in the image, object details, modeled sensor type, 3D environment, camera location and position, background objects/environment, time of day, weather and other information as appropriate to define the imaging scenario. In step 414, the synthetic infrared training dataset is used to train a neural network. In step 416, the neural network is validated using real world infrared images and the results are used to update the parameters of the virtual world and imaging scenarios to improve performance.

Figure 5:
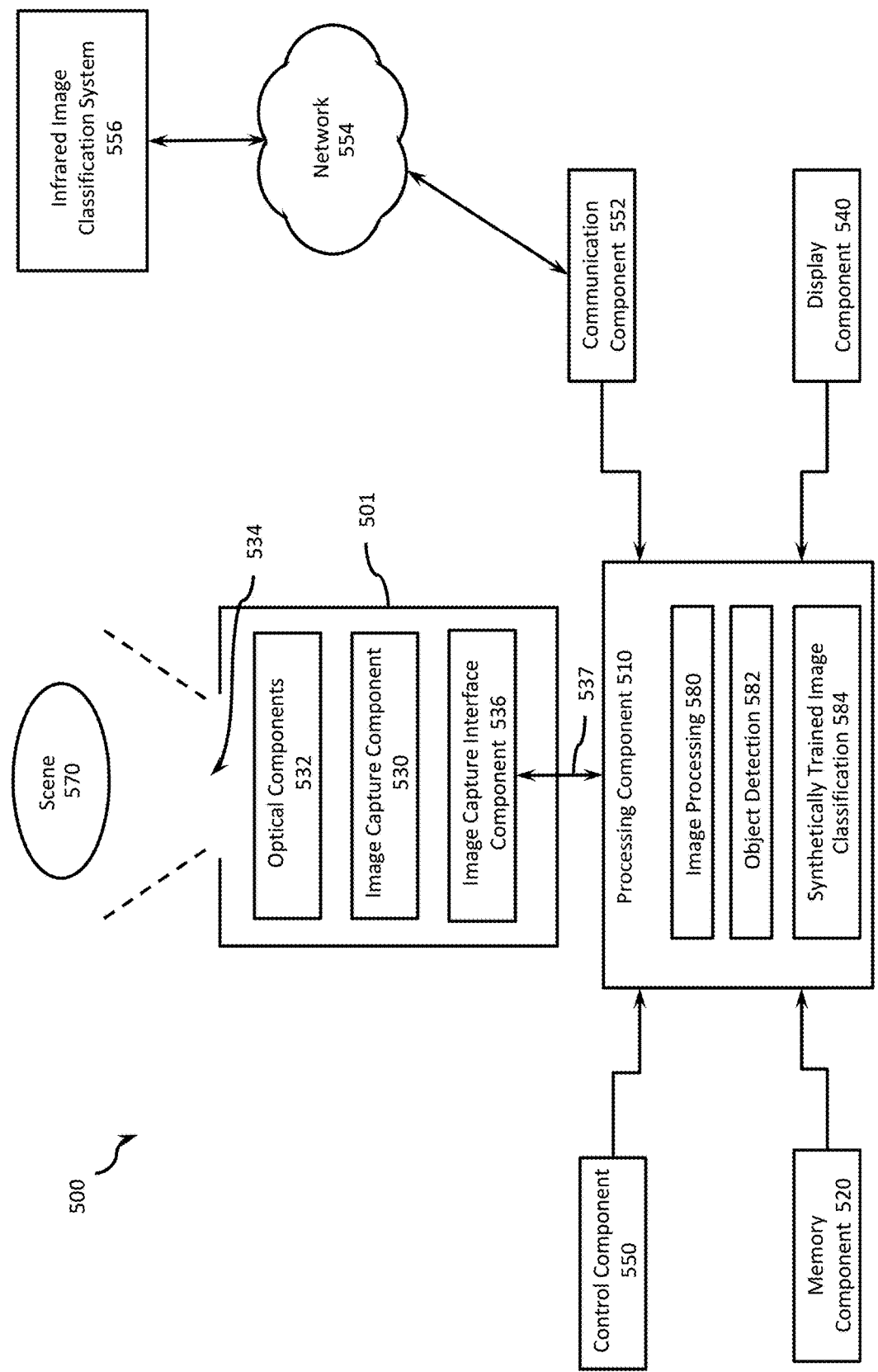
FIG. 5 illustrates an infrared imaging system for use with an image classification system trained using synthetic infrared image data, in accordance with various embodiments of the present disclosure.

Referring to FIG. 5, various embodiments of an infrared imaging system will be described. The infrared imaging system may be used to capture and process images to detect, classify and/or count objects that appear in a field of view. As illustrated, the infrared imaging system 500 may be used for imaging a scene 570 in a field of view. The infrared imaging system 500 includes a processing component 510, a memory component 520, an image capture component 530, optical components 532 (e.g., one or more lenses configured to receive electromagnetic radiation through an aperture 534 in camera component 501 and pass the electromagnetic radiation to image capture component 530), an image capture interface component 536, a display component 540, a control component 550, a communication component 552, and other sensing components 560.

In various embodiments, infrared imaging system 500 may be implemented as an imaging device, such as camera component 501, to capture image frames, for example, of the scene 570 in the field of view of camera component 501. In some embodiments, camera component 501 may include image capture component 530, optical components 532, and image capture interface component 536 housed in a protective enclosure. Infrared imaging system 500 may represent any type of camera system that is adapted to detect infrared radiation and provide associated image data. Infrared imaging system 500 may be implemented with camera component 501 at various types of fixed locations and environments (e.g., highway overpass to track traffic, as part of a premises surveillance system, to monitor/track people, etc.). In some embodiments, camera component 501 may be mounted in a stationary arrangement to capture successive images of a scene 570. Infrared imaging system 500 may include a portable device and may be implemented, for example, as a handheld device and/or coupled, in other examples, to various types of vehicles (e.g., a land-based vehicle, a watercraft, an aircraft, a spacecraft, or other vehicle).

Processing component 510 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 510 is adapted to interface and communicate with components 520, 530, 540, 550, 560, and 562 to perform method and processing steps as described herein. Processing component 510 is also adapted to detect and classify objects in the images captured by the image capture component 530, through image processing module 580, object detection module 582, and synthetically trained object classification module 586.

It should be appreciated that processing operations and/or instructions may be integrated in software and/or hardware as part of processing component 510, or code (e.g., software or configuration data) which may be stored in memory component 520. Embodiments of processing operations and/or instructions disclosed herein may be stored by a machine readable medium in a non-transitory manner (e.g., a memory, a hard drive, a compact disk, a digital video disk, or a flash memory) to be executed by a computer (e.g., logic or processor-based system) to perform various methods disclosed herein.

Memory component 520 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 510 is adapted to execute software stored in memory component 520 and/or a machine-readable medium to perform various methods, processes, and operations in a manner as described herein.

Image capture component 530 includes, in one embodiment, one or more sensors for capturing image signals representative of an image, of scene 570. In one embodiment, the sensors of image capture component 530 provide for representing (e.g., converting) a captured infrared image signal of scene 570 as digital data (e.g., via an analog-to-digital converter included as part of the sensor or separate from the sensor as part of infrared imaging system 500). Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

Processing component 510 may be adapted to receive image signals from image capture component 530, process image signals (e.g., to provide processed image data), store image signals or image data in memory component 520, and/or retrieve stored image signals from memory component 520. In various aspects, processing component 510 may be remotely positioned, and processing component 510 may be adapted to remotely receive image signals from image capture component 530 via wired or wireless communication with image capture interface component 536, as described herein.

Display component 540 may include an image display device (e.g., a liquid crystal display (LCD)) or various other types of generally known video displays or monitors. Control component 550 may include, in various embodiments, a user input and/or interface device, such as a keyboard, a control panel unit, a graphical user interface, or other user input/output. Control component 550 may be adapted to be integrated as part of display component 540 to operate as both a user input device and a display device, such as, for example, a touch screen device adapted to receive input signals from a user touching different parts of the display screen.

Processing component 510 may be adapted to communicate with image capture interface component 536 (e.g., by receiving data and information from image capture component 530). Image capture interface component 536 may be configured to receive image signals (e.g., image frames) from image capture component 530 and communicate image signals to processing component 510 directly or through one or more wired or wireless communication components (e.g., represented by connection 537) in the manner of communication component 552 further described herein. Camera component 501 and processing component 510 may be positioned proximate to or remote from each other in various embodiments.

In one embodiment, communication component 552 may be implemented as a network interface component adapted for communication with a network including other devices in the network, and may include one or more wired or wireless communication components. In various embodiments, a network 554 may be implemented as a single network or a combination of multiple networks, and may include a wired or wireless network, including a wireless local area network, a wide area network, the Internet, a cloud network service, and/or other appropriate types of communication networks.

In various embodiments, infrared imaging system 500 provides a capability, in real time, to detect, classify and count objects in the scene 570. For example, infrared imaging system 500 may be configured to capture images of scene 570 using camera component 501 (e.g., an infrared camera). Captured images may be received by processing component 510 and stored in memory component 520. The image processing module 580 and object detection module 582 may extract from each of the captured images, a subset of pixel values of scene 570 corresponding to a detected object. The synthetically trained image classification module 584 classifies the detected object and stores the result in the memory component 520, an object database or other memory storage in accordance with system preferences. In some embodiments, infrared imaging system 500 may send images or detected objects over network 554 (e.g., the Internet or the cloud) to a server system, such as infrared image classification system 556, for remote image classification.

The object detection module 582 and synthetically trained image classification module 584 provide analysis of the captured images to detect and classify an object in a captured image. In various embodiments, the object detection module 582 interfaces with an object classification database, which stores information for analyzing and identifying digitized objects and other sensor information captured by an image capture device. For example, the database may store object classification criteria for generally identifying the class of a detected object (e.g., a person, an animal, a car, motorcycle, plant life, blowing objects, a shadow, etc.), reference images of known objects which may include synthetic infrared images, field of view parameters for each image capture device (e.g., to for use in estimating object size), learned and configured activities common to each image capture device (e.g., false detections and classifications of objects may have been triggered by a nonstandard event), and other object classification information.

Figure 6A:
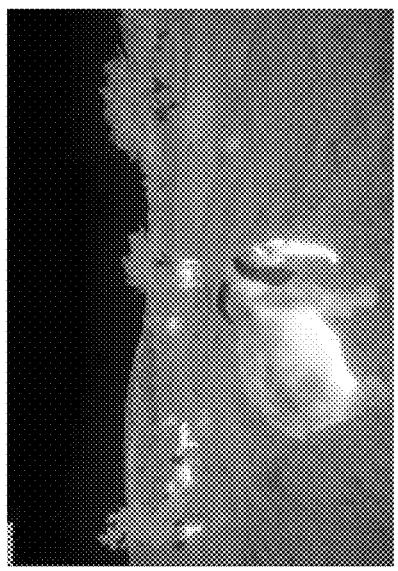
FIGS. 6A-E illustrate sample images for use in an object classification system trained to classify an elephant, in accordance with various embodiments of the present disclosure.
Figure 6B:
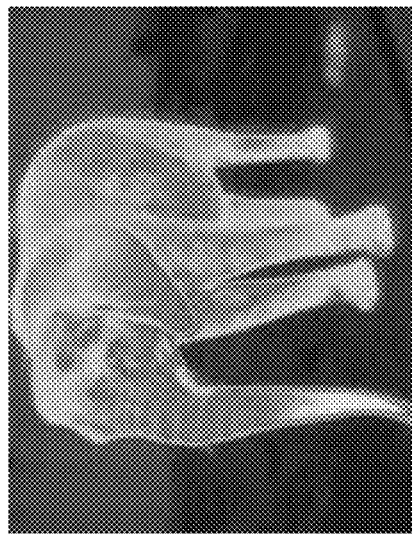
Figure 6C:
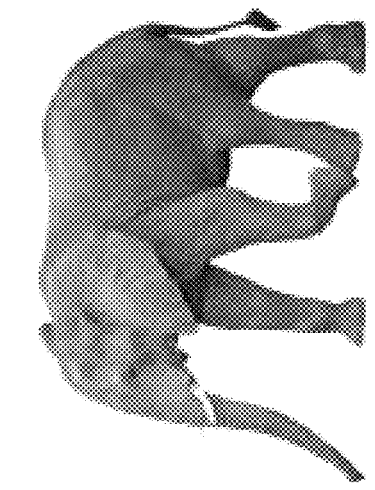
Figure 6E:
Figure 6D:
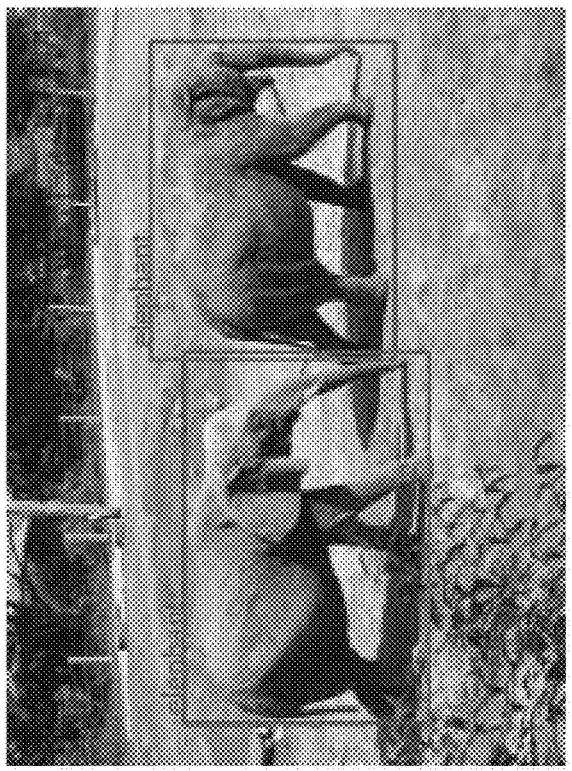

Various embodiments of image classification systems will now be described with reference to FIGS. 6-9. FIGS. 6A-E illustrate an object detection scenario for the detection of an elephant. The object database of the synthetic imaging system may include various images of an elephant object (FIG. 6A) and an infrared image of an elephant object (FIG. 6B), which are utilized to create a virtual 3D world. In an implemented setting, thermal images of a scene (FIG. 6C) are acquired along with an optical image of the scene (FIG. 6D). The elephants may be detected both through optical image classification and infrared image classification. To create the synthetic dataset, 3D models of various elephants are created and the surface skin is defined, allowing an elephant object to be positioned at various angles in the virtual world. The scene is also defined to create virtual world, such as a savanna setting (FIG. 6E). The various aspect of the savanna setting can be modeled including elephants, trees, bushes, rocks, and other animals which are placed randomly throughout various synthetic images to approximate a real world setting. A synthetic image is then acquired by applying infrared radiation models to the elephant and other objects in the scene and simulating the infrared sensor response. Constructing real world images may be impractical, requiring travel, searching for various settings and animal scenarios, weather conditions and other desired elements of a training image.

Referring to FIGS. 7A and 7B, a drone detection system will be described. In the illustrated embodiment, a city environment is illustrated for detecting drones in the sky. Various virtual city and suburban environments can be randomly constructed and imaged including different sky conditions (cloud types, sunny, nighttime), drone types, sensor types, sensor locations and viewing angles to create a synthetic dataset.

Referring to FIGS. 8A and 8B, a search and rescue system is illustrated. Various locations can be modeled for use in identifying people from the air (e.g., from a helicopter or drone), such as a person hiding under trees. The infrared image sensor can be positioned as a drone or helicopter flying over the terrain to capture a variety of terrain, locations, angles and environmental conditions.

Figure 9:
FIG. 9 illustrates sample images for use in an object classification system trained to classify an automobile, in accordance with various embodiments of the present disclosure.
Figure 9:
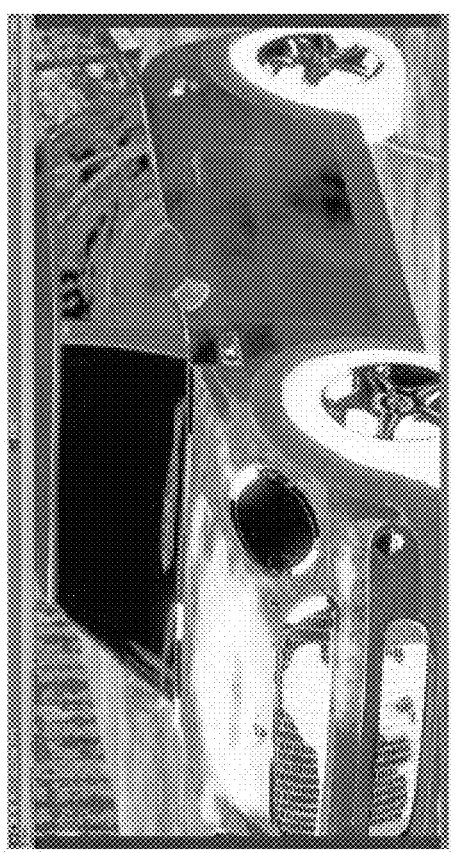
Figure 9:
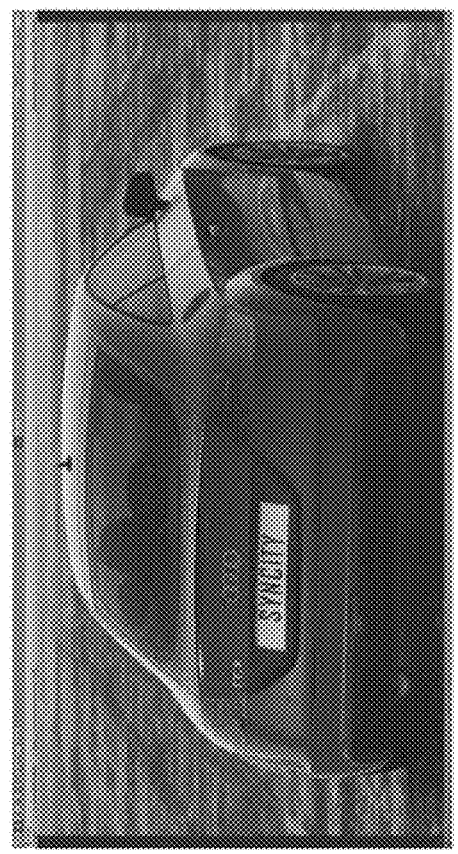
Figure 9:
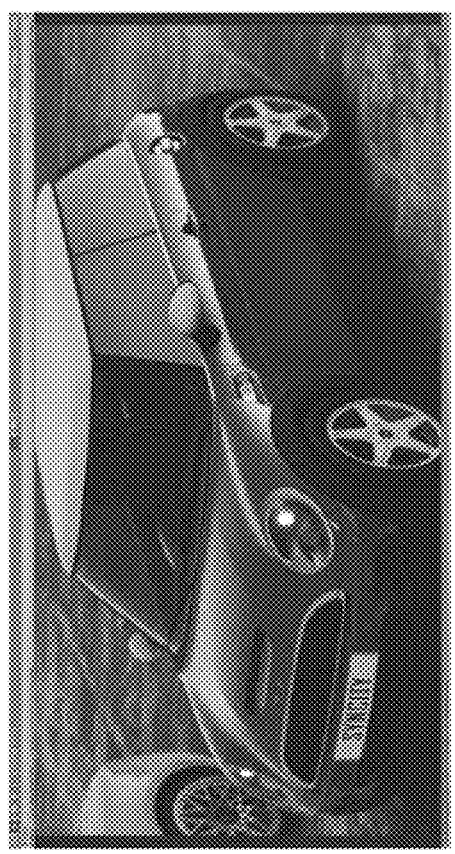

Referring to FIG. 9 an automobile detection system is illustrated. In this embodiment, an automobile object may include optical images of a variety of car types from multiple angles, and infrared images of the same cars from the same angle, which can be used for vehicle identification.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
one or more processors and memory devices configured to:
receive an infrared image captured from an infrared sensor; and
implement an image classification system operable to classify the infrared image, the image classification system comprising a neural network trained on synthetic infrared training data comprised of synthetic infrared images rendered by applying infrared radiation models to corresponding virtual objects in a virtual three-dimensional scene and constructing a synthetic infrared image of the virtual three-dimensional scene in accordance with an infrared sensor response model;
wherein at least one virtual three-dimensional scene is generated in response to a neural network validation process; and
wherein at least one synthetic infrared image of the at least one virtual three-dimensional scene is added to the synthetic infrared training data resulting in a reduction of a validation error from the neural network validation process.

2. The system of claim 1, wherein the infrared sensor comprises a multi spectral dynamic image sensor having infrared sensor components and visible light sensor components; wherein the infrared image is enhanced by a visible light image generated from the visible light sensor components; and wherein the infrared sensor response model produces an imaging response for a virtual multi spectral dynamic image sensor.

3. The system of claim 1, further comprising:
a database storing the synthetic infrared training data.

4. The system of claim 1, wherein the neural network comprises a convolutional neural network.

5. The system of claim 1, wherein the one or more processors and memory devices are further configured to implement an infrared training data generation system comprising:
- an object database comprising a plurality of three-dimensional objects;
- a three-dimensional scene modeling system operable to generate the virtual three-dimensional scene comprising a subset of the plurality of three-dimensional objects;
- an infrared radiation model database comprising infrared radiation models corresponding to the three-dimensional objects in the object database;
- an infrared sensor modeling system operable to model an imaging response for an infrared sensor virtually represented in the virtual three-dimensional scene; and
- a synthetic infrared imaging system operable to render the synthetic infrared images as received by the virtually represented infrared sensor in the virtual three-dimensional scene, each synthetic infrared image being generated using the infrared radiation models of the three-dimensional objects in the virtual three-dimensional scene and the model of the infrared sensor;
- wherein the at least one synthetic infrared image of the at least one virtual three-dimensional scene added to the synthetic infrared training data is generated by increasing resolution to help distinguish between objects, thereby adjusting the synthetic infrared training data to improve accuracy.

6. The system of claim 5, wherein the one or more processors and memory devices are further configured to implement:
- an environmental component operable to apply environmental effects to the virtual three-dimensional scene, including at least one of sun, lighting, and weather elements; and wherein:
- the synthetic infrared imaging system is operable to render an image including virtual motion of one or more objects in the virtual three-dimensional scene;
- the synthetic infrared image is stored in a training set database;
- the virtual three-dimensional scene is generated in response to a neural network validation process, and wherein an accuracy of at least one of the infrared radiation models is adjusted in response to a detected validation error; and
- the synthetic infrared imaging system is further operable to add noise to a subset of the synthetic infrared images to account for sensor variations between infrared imaging devices.

7. A method comprising:
- capturing an infrared image of a scene; and
- classifying at least one object in the captured infrared image by feeding the infrared image to a neural network trained on a synthetic infrared training dataset comprising a plurality of synthetically generated infrared images; wherein each of the plurality of synthetically generated infrared images is rendered as a response received by a virtual infrared sensor in a virtual three-dimensional scene comprising a plurality of virtual three-dimensional objects; and
- determining a validation error in the classifying at least one object in the infrared image; and
- generating a new virtual three-dimensional scene in response to the validation error;
- rendering a new synthetic infrared image of the new virtual three-dimensional scene; and
- adding the new synthetic infrared image to the training dataset to produce an updated training dataset to reduce the validation error of a neural network training on the updated training dataset.

8. The method of claim 7, further comprising capturing a visible spectrum image of the scene, wherein the infrared image is enhanced by the captured visible spectrum image.

9. The method of claim 8, further comprising applying a virtual visible light sensor to the virtual three-dimensional scene to provide a synthetic visual image, and wherein the synthetic infrared training dataset includes synthetic images enhanced by visible light.

10. The method of claim 7, further comprising generating the synthetic infrared training dataset, wherein generating the synthetic infrared training dataset comprises:
- defining a plurality of three-dimensional objects;
- defining a plurality of infrared radiation models, wherein each of the plurality of three-dimensional objects is associated with at least one infrared radiation model;
- defining an infrared sensor model to virtually represent an imaging response of an infrared sensor;
- building a plurality of virtual three-dimensional scenes, each scene comprising one or more of the plurality of three-dimensional objects; and
- generating a synthetic infrared image of each of a plurality of virtual three-dimensional scenes by applying a corresponding infrared radiation model to each three-dimensional object in the virtual three-dimensional scene, and determining an imaging sensor response to the scene using the infrared sensor model.

11. The method of claim 10, wherein applying the corresponding infrared radiation model comprises applying a motion characteristic to at least one of the three-dimensional objects in the virtual three-dimensional scene.

12. The method of claim 10, further comprising:
- storing each image in the synthetic infrared training dataset with corresponding annotations describing the scene;
- validating the synthetic infrared training dataset, and adjusting an accuracy of at least one infrared radiation model in response to a detected validation error; and
- adding noise to a subset of the synthetically generated infrared images to account for noise generated by the infrared sensor.

13. A system comprising:
- one or more processors and memory devices configured to implement:
- an object database comprising a plurality of three-dimensional objects;
- a three-dimensional scene modeling system operable to generate one or more virtual three-dimensional scenes comprising a subset of the plurality of three-dimensional objects;
- an infrared radiation model database comprising infrared radiation models corresponding to the objects in the object database;
- an infrared sensor modeling system operable to model an imaging response for an infrared sensor virtually represented in the virtual three-dimensional scene; and
- a synthetic infrared imaging system operable to render a synthetic infrared image received from the virtually represented infrared sensor in the three-dimensional scene, the synthetic infrared image being generated using the infrared radiation models of the three-dimensional objects in the generated virtual three-dimensional scene and the virtually represented model of the infrared sensor.

14. The system of claim 13, wherein the one or more processors and memories is further configured to implement:
an environmental component operable to apply environmental effects to the virtual three-dimensional scene, including at least one of sun, lighting, and weather elements; and
wherein the synthetic infrared imaging system is operable to render an image including virtual motion of one or more objects in the virtual three-dimensional scene.

15. The system of claim 14, wherein:
the synthetic infrared image is stored in a training set database;
the virtual three-dimensional scene is generated to train a neural network for object classification; and
the virtual three-dimensional scene is generated in response to a neural network validation process,
in response to a validation error being detected an object in the scene is rendered at a higher resolution to generate a high resolution synthetic infrared image, and
the high resolution synthetic infrared image is added to the training set database, resulting in a reduction of a validation error from the neural network validation process.

16. The system of claim 14, wherein a plurality of synthetic infrared images are generated using the infrared sensor model, and wherein the synthetic infrared imaging system is further operable to add noise to a subset of the synthetic infrared images to account for sensor variations between infrared imaging devices.

17. A method of using the system of claim 13 comprising:
defining parameters of a training dataset including at least one object for classification, at least one infrared sensor for infrared image capture, and at least one use environment;
building a three-dimensional virtual environment in accordance with the parameters;
generating imaging scenarios including randomized object placement within the three-dimensional virtual environment; and
for each imaging scenario, generating a corresponding synthetic infrared image by applying infrared radiation response models to objects in the three-dimensional virtual environment and simulating an infrared sensor response.

18. The method of claim 17, further comprising:
storing each synthetic infrared image in a database with corresponding annotations describing the corresponding imaging scenario.

19. The method of claim 18, further comprising:
training a neural network using the stored synthetic infrared images;
validating the training using infrared images captured by an infrared sensor to detect classification errors; and
updating the parameters in response to detected classification errors to improve classification accuracy.

20. A database of synthetic images generated according to the method of claim 17.

* * * * *